United States Patent [19]

Smit

[11] Patent Number: 5,311,812

[45] Date of Patent: May 17, 1994

[54] RAPIDLY HEATING COFFEE MAKING APPARATUS HAVING A LARGE CAPACITY

[75] Inventor: Gerard C. Smit, Amerongen, Netherlands

[73] Assignee: Smitdesign B.V., Amerongen, Netherlands

[21] Appl. No.: 986,140

[22] Filed: Dec. 4, 1992

[30] Foreign Application Priority Data

Dec. 6, 1991 [NL] Netherlands .......................... 9102044
Mar. 30, 1992 [NL] Netherlands .......................... 9200585

[51] Int. Cl.⁵ ............................................. A47J 31/00
[52] U.S. Cl. ........................................ 99/280; 99/295; 99/305
[58] Field of Search ................. 99/279, 280, 281, 282, 99/283, 295, 300, 299, 304, 305, 306, 316; 426/433

[56] References Cited

U.S. PATENT DOCUMENTS 3,347,151 10/1967 Ronalds ................................. 99/295
3,443,508 5/1969 Reynolds .............................. 99/295

Primary Examiner—Robert W. Jenkins
Attorney, Agent, or Firm—Merchant, Gould, Smith, Edell, Welter & Schmidt

[57] ABSTRACT

The invention relates to a rapidly heating coffee making apparatus having a large capacity (1, 1.5 or 2 gallons) for use in canteens and the like, in which in a housing (1) the filter holder (6) is arranged above the coffee tank (7) and the spray head (5) is arranged directly above the filter holder, wherein the water reservoir (3) of the apparatus, adapted for the batchwise heating of water, is arranged directly above the spray head (5).

19 Claims, 2 Drawing Sheets

RAPIDLY HEATING COFFEE MAKING APPARATUS HAVING A LARGE CAPACITY

This invention relates to a coffee making apparatus having a large capacity (0.5 to 2 gallons) for use in canteens and the like, the object of the invention being to provide such a coffee making apparatus that is compact, easy to service and has attractive possibilities of use.

In a preferred embodiment the apparatus moreover has a high hour capacity.

Known apparatuses of the subject type comprise a water reservoir in which the water is heated either according to the displacement principle or via heat exchange. In the case of the displacement principle, the reservoir, in the same manner as with a boiler, contains heated water which is supplemented from the lower end with cold water from the water mains while hot water egresses at the top of the reservoir. In the case of the heat exchange principle, in the reservoir an amount of water is maintained at a high temperature and a coil connected to the water mains extends through the water mass. As the water flows through the coil, it is heated through heat exchange with the water mass. In either case, to ensure that the water drained for making coffee is of sufficiently high temperature, the reservoir must have a relatively great height. Accordingly, with the known coffee makers, the water reservoir is arranged behind or beside the coffee tank.

Arranged directly above a coffee tank is a filter holder, which can be pulled outwards, for a paper filter in which ground coffee can be deposited.

Mounted in a horizontal wall above the level of the coffee filter is a spray head from which hot water is discharged from the reservoir and dispersed over the ground coffee.

With coffee makers of large capacity, it is known to make the coffee tank detachable, so that the tank, provided with a tap, can be used elsewhere.

The underlying idea of the invention is that such an apparatus can be made of more compact construction than the known apparatuses when the known water heating principles are abandoned to proceed to the batchwise heating of brewing water, "batchwise" heating meaning that a given amount of water is heated to the desired temperature, in particular an amount that corresponds to the total amount of brewing water required for the maximum amount of coffee to be made.

Thus, it will suffice to use a relatively small water reservoir whose contents, in principle, need only be sufficient for the maximum amount of coffee to be made in one brewing cycle (as well as a reserve for hot water tapping and for preventing the heating elements from boiling dry) whilst for the reservoir a position in the apparatus other than beside or behind the coffee tank can be chosen.

According to the invention, particularly in a coffee brewing apparatus where in a housing the filter holder is arranged above the coffee tank and the spray head is arranged directly above the filter holder, the water reservoir of the apparatus, adapted for the batchwise heating of water, is arranged directly above the spray head.

Thus, the apparatus can be constructed as a slender, and, partly because of the limited volume of the water reservoir, short column.

Apart from the advantage of a compact construction, an advantage is thus obtained in that no pump is necessary for forcing hot water up to the spray head. A further favourable aspect of the chosen arrangement of the water reservoir is that the spray head wall is maintained at a relatively high temperature by the hot water reservoir arranged directly above it, which minimizes condensing on the horizontal spray head wall as a result of water vapor rising from the coffee filter after hot brewing water has passed through the filter. In known coffee makers, where the hot water reservoir is arranged elsewhere, the spray head wall will be relatively cool and a great deal of condensate will be formed on the underside of the spray head wall, this condensate leading to undesirable spill when the filter holder is removed.

Another important advantage of a coffee maker adapted for batchwise heating of the brewing water is that at the time when the water is poured onto the ground coffee, all the water always has the proper temperature and that the desired, organoleptically determined water/coffee contact time can be maintained for the total available amount of water. As explained above, with a water heater of the displacement type, i.e., involving the displacement of hot water from the top of the reservoir as a consequence of cold water being supplied from the bottom, it is difficult to maintain the desired high water temperature at the same value throughout the coffee making process and in order to approximate this situation as much as possible, a high reservoir having an ample surplus volume is necessary. Moreover, with batchwise heating of brewing water, the percolation time of coffee is independent of the water mains pressure.

In further elaboration of the invention, the water reservoir with built-in heating element, level control means and a control panel may be constructed as a detachable unit.

This relatively small unit can be replaced in its entirety in case of complaints that cannot be directly remedied in situ. Accordingly, to be able to provide adequate service in the majority of cases, a serviceman need only bring spare water reservoirs of limited volume, in addition to printed circuit boards and suchlike parts, which do not occupy much space.

In a practical embodiment of the invention, the water reservoir may be constructed in the form of a horizontal U with a chamber present between the legs of the U, this chamber comprising the level control means, which may be of any type, such as control elements responsive to the hydrostatic pressure, for switches, sensors, and the like, as well as at least one water drain connection for a duct terminating above the spray head.

In a coffee maker that can be set for different amounts of brewed coffee, for instance 1, 1.5 and 2 gallons (3.6, 5.4 and 7.2 liters), three water drain connections may be provided at such levels that upon tapping hot water via such a drain connection, the amount of hot water that can drain via that connection corresponds to the desired amount of coffee.

According to the invention, the respective drain connections may each be provided with a valve of a diameter selected in accordance with the desired water/coffee contact time. As one of the valves is opened, the part of the heated water that is located above this valve will flow from the reservoir onto the coffee filter at a rate that ensures the organoleptically determined water/coffee contact time.

In order to considerably shorten the heating time, i.e., the time required to adjust a (partly) drained reservoir to the desired temperature again (ca. 95° C., so that the outflow temperature is between the organoleptically determined 92° and 96° C.), in a preferred embodiment of the coffee making apparatus according to the invention, the apparatus comprises a heating element having a low-power and a high-power state or mode, a time switch capable of opening each of the outlet valves for a desired time, a temperature sensor in the lower portion of the reservoir, which sensor is capable of activating the high-power mode of the heater when the temperature in the lower portion of the reservoir falls below a set temperature limit, whilst the level control means are adapted for admitting (mains) water during the brewing cycle via a connection near the bottom of the reservoir.

Whilst in the embodiment described hereinabove in each brewing cycle the part of the reservoir located above a selected drain connection is emptied and must be replenished and heated after the brewing cycle, the coffee making apparatus in the preferred embodiment operates as follows.

Starting from a completely filled reservoir which is maintained at the proper temperature by the heater in the low-power mode, at the outset of a selected brewing cycle the valve in question is opened by the time switch. Practically simultaneously, as the level in the reservoir drops, mains water is admitted at the bottom under the control of the level controller, whereby the water level in the reservoir is kept substantially constant. As soon as the temperature sensor senses that the temperature of the water in the lower portion of the reservoir is falling below the desired temperature range, the heater is switched to the high-power mode, so that the temperature decrease at the bottom of the reservoir is corrected. The high-power mode can also be switched on when a certain amount of water, for instance 0.5 liter, has been added. It is thus ensured that the amount of brewing water in the upper portion of the reservoir, which is used for the brewing cycle, always remains within the desired temperature limits.

In this preferred embodiment of the invention, when the brewing cycle has come to an end, the reservoir is already substantially filled with water and the upper portion of the water mass is already within the desired temperature range. Accordingly, adjustment of the temperature of the total reservoir contents to within this temperature range can be effected in a very short time.

When positioning the tank of such coffee makers, the following must be taken into account.

The tap must be located near the bottom of the tank, i.e., at a height above the table, counter, or the like, that is sufficient for a coffee cup to be held under the tap. Preferably, a drip tray is arranged under the tap. These considerations determine the minimum vertical distance between the bottom of the coffee tank and the lower end of the apparatus. Thus, there are known coffee makers that are positioned on legs.

In addition to the minimum clearance at the lower end as discussed above, consideration must be given to the possibility of filling a (thermos) flask or jug with coffee via the tap of the tank. For this purpose, known types of coffee makers must be positioned near the edge of the table, so that such a jug can be held below the level of the tabletop to enable it to be filled.

This, however, is a drawback in that there is no room at the front of the apparatus for a drip tray.

According to the invention, these problems are avoided by mounting the coffee tank in the housing of the apparatus so as to be slidable in outward direction.

Thus, the apparatus can be arranged at a certain distance from the front edge of the table so that a drip tray can be arranged in front of the apparatus and when a jug is to be filled, the coffee tank, after removal of the drip tray, can be pulled in forward direction to such an extent that the tap is disposed beyond the front edge of the table.

The coffee tank is preferably constructed as a rectangular box which is supported by a carrier with upright edges, mounted on a part of a sliding guide whose other part is mounted on the housing of the coffee making apparatus.

On the one hand, such a block-shaped tank construction has an advantage in that, given the same volume and the same maximum transverse dimensions, a smaller height will suffice, and, on the other, in the manner described, a stable support on a slide can be obtained, which further provides the possibility of lifting the tank in its entirety from the apparatus for use elsewhere.

Preferably, the tank is provided with built-in warming means and the tank and the housing are provided with cooperating electrical connecting elements which automatically engage and disengage upon inward retraction and outward extension, respectively.

Further, according to the invention, the water reservoir can be connected to a drain pipe for the periodical refreshment of the water present in the reservoir. This is important in particular when the apparatus has not been in use for some time, for instance during vacations. Furthermore, a provision (not shown) may have been made in the heating means for compensating air pressure differences, in such a manner that, in case of low air pressures, where the boiling point of water is lower than 100° C., the water is prevented from boiling at the set coffee brewing temperature of, for instance, 97° C. Via a setting knob, the margin by which the maximum temperature can be adjusted can be set.

To clarify the invention, some exemplary embodiments of the coffee making apparatus of large capacity will now be described, with reference to the accompanying drawings.

According to the drawings, the apparatus in the first embodiment comprises a housing 1 with a removable top 2. Top 2 covers a water reservoir 3 which is detachably mounted on top of the housing 1.

Figure 4:
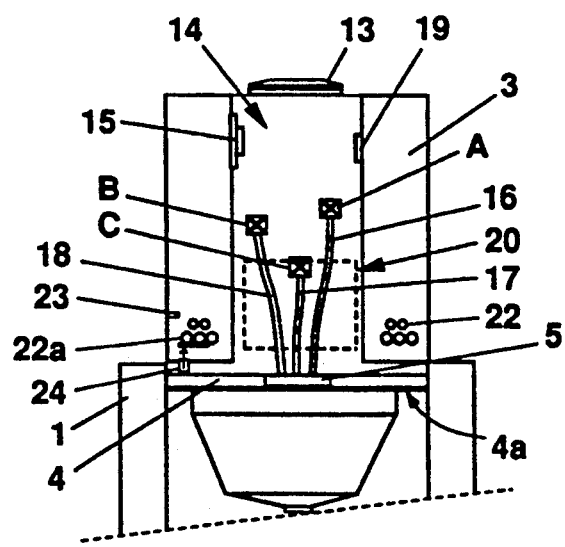
FIG. 4 is an elevation of the upper part of the apparatus with the top detached, in a second, preferred embodiment.

Under the reservoir 3, in a transverse wall 4 of the reservoir 3, a spray head 5 is mounted, and under the spray head 5 a filter 6 is shown, which can be pulled forward from the housing. The transverse wall 4 can, as shown in FIG. 4, comprise a hollow space bounded at the bottom by an insulating plate 4a, for instance of DELRIN ®, so as to limit the formation of condensate as a result of water vapor rising from the coffee filter after hot brewing water has passed through the filter. Arranged on rails 8 under the outlet orifice of the filter holder 6 is a rectangular coffee tank 7 supported by a carrier with upright edges 9, likewise arranged for forward sliding movement relative to the housing 1.

Figure 1:
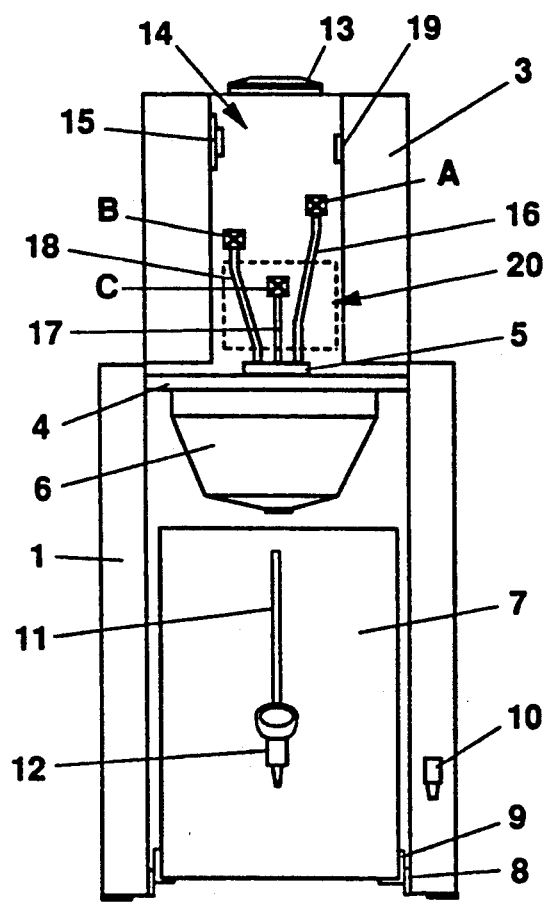
FIG. 1 is a front view of the apparatus with detached top.

The front view of FIG. 1 further shows a hot water tap 10 (for making tea and the like). The tank comprises a level gauge 11 and a coffee tap 12. The tank 7 further contains warming means (not shown) and an electrical connection for a socket (not shown).

The water reservoir 3 comprises a closing cap 13 and has a U-shaped configuration in horizontal cross-section, with a chamber 14 present between the legs of the U.

As can be seen in the front view of FIG. 1, in a wall of the chamber 14 a plurality of valves, in this case three, A, B, and C have been mounted at three levels which have been selected so that such parts of the water reservoir 3, bounded at the top by a level controller 15, as are located above the respective levels, have volumes that correspond to three amounts of coffee to be made in one cycle, for instance 3.6, 5.4 and 7.2 liters. The valves A, B and C terminate in the spray head 5 via respective outlets 16, 17 and 18. Further, a valve 19 is arranged which is connected to the hot water tap 10.

After drainage of the water and removal of the electrical connections (not shown), the water reservoir 3, together with a control panel 20, only schematically shown by means of dotted lines in FIG. 1, can be detached from the subjacent part of the housing. Electrical feed lines and control current lines extend from the control panel into the chamber 14 and through a cable channel that is present behind a wall 21 visible at the lower part of the water reservoir 3 between the housing 1 and the top 2. Via this cable channel electrical conductors extend to a flat space which is present behind the detachable rear wall of the housing 1a and accommodates other control devices such as printed circuit boards and the like.

The apparatus operates as follows: When the apparatus is switched on via the control panel 20, the water reservoir is filled from the water mains under the control of the level controller 15, and the heating element present in the reservoir is switched on. A paper filter and an amount of coffee corresponding with the desired amount of coffee to be made, for instance 1 gallon, are placed in the filter holder 6. When the water in the reservoir has been heated to 97° C., this is indicated on the control panel and a selector switch for the desired amount of coffee (for instance 1 gallon) can be operated.

As a result, the valve A, B or C that corresponds with 1 gallon (valve A) is opened and the hot water above the level of that valve is allowed to drain from the water reservoir via that valve and the associated outlet 16, 17 or 18 to the spray head 5. The diameter of the associated outlet 16 influences the flow rate in such a manner that the desired water/coffee contact time in the filter holder 6 is ensured.

Termination of the coffee making process can be indicated on the control panel 20 and be monitored via the level gauge 11.

During coffee brewing, a time switch temporarily switches off the level controller 15. After coffee brewing, the water reservoir is automatically replenished in the above-indicated manner and for a next coffee brewing cycle one must wait until the control panel 20 indicates that the water has reached the required temperature.

The tank 7 can be moved over the rails 8 toward the front to such an extent that the tap 12 is located beyond the edge of the table on which the apparatus is arranged, so that a container that could not otherwise be held under the tap for lack of space can be held under the tap.

The tank 7, after being moved entirely out of the housing 1, can also be lifted off the rails 8 and be used elsewhere.

Figure 3:
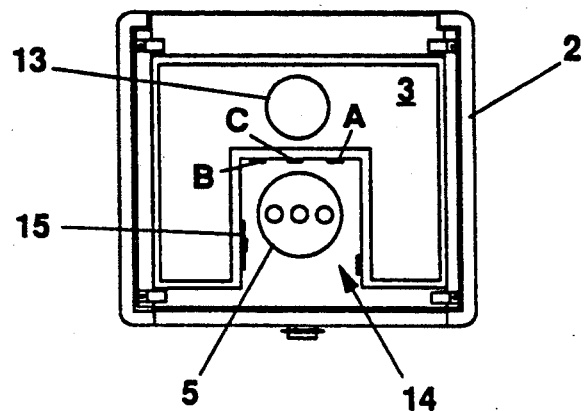
FIG. 3 is a top plan view of the apparatus.
Figure 2:
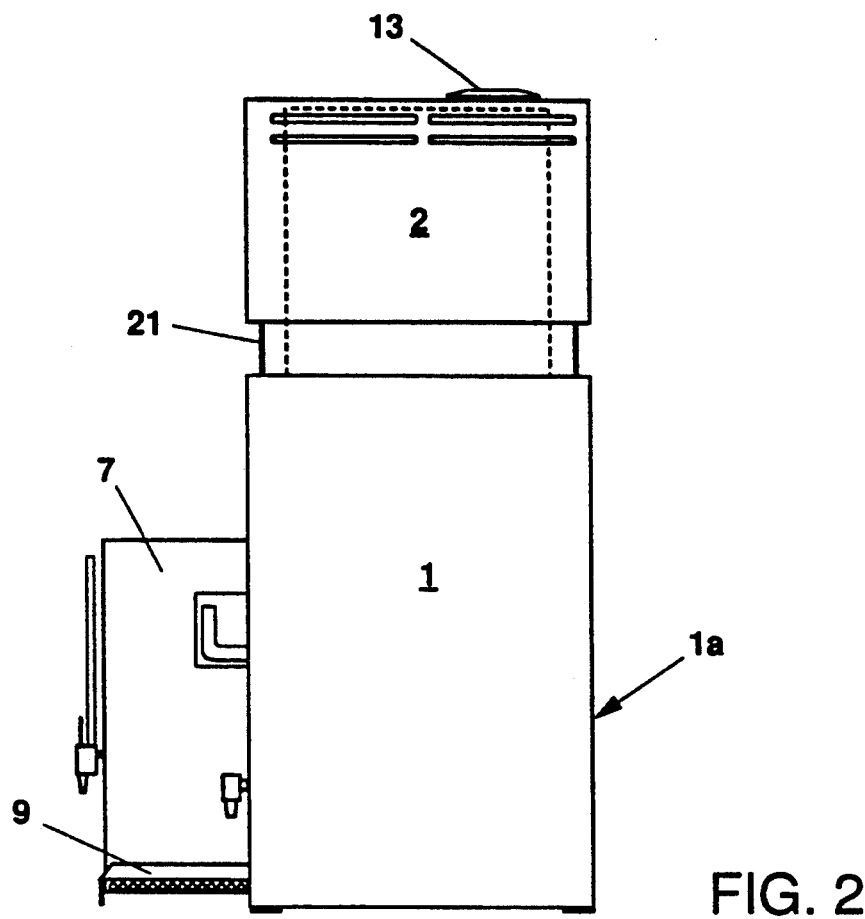
FIG. 2 is a side elevation of the apparatus according to FIG. 1 with the top fitted thereon.

The preferred embodiment of FIG. 4 differs chiefly from that shown in FIGS. 1-3 because of provisions that enable a different manner of maintaining the optimum brewing water temperature in the reservoir during a brewing cycle.

Thus, two heating elements 22, 22a are present so as to enable the heating element to be switched to a low-power mode of for instance 1100 watts and a high-power mode of for instance 6600 watts. Further, a time switch (not shown) forming part of the control panel, is present, capable of opening each of the valves A, B or C for a selected time. FIG. 4 shows a temperature sensor 23 in the lower part of the reservoir 3, as well as a (mains) water inlet 24 in the bottom of the reservoir 3.

This preferred embodiment of the coffee making apparatus operates as follows.

Starting from a completely filled reservoir 3 with water of ca. 95° C. which is maintained at the required temperature by the 1100 w heater 22, the relevant valve A, B or C is opened by the time switch after operation of the selector switch for a given amount of coffee to be made.

Practically simultaneously with the drop of the level in the reservoir 3, mains water is admitted at the bottom at 24, whilst the water level in the reservoir 3 is kept substantially constant via the level controller 15.

As soon as the temperature sensor 23 senses that the temperature of the water has fallen below the temperature range 92°-96° C., the 5500 w heater 22a is supplementarily switched on so as to raise the high power of 6600 w.

When the brewing cycle has been terminated after 8 minutes, the reservoir 3 is already filled and a next cycle can be started after 3 minutes.

In terms of capacity this means, compared with the embodiment of FIGS. 1-3, that as a result of the reduction of the heating time from 7 to 3 min, the hour capacity is increased from 4 to 6 runs of 43.2 liters, necessary to make 8 liters (about 10 gallons) = 300 cups of coffee. The improvements over the prior art (displacement systems for water heating) already achieved with the embodiment according to FIGS. 1-3, such as compactness, greater ease of servicing, etc, are preserved in the preferred embodiment according to FIG. 4.

It will be clear that the invention is not limited to the embodiments described, but modifications within the framework of the invention are possible. Essential to the invention is in any case that a water reservoir with a capacity corresponding with the maximum amount of coffee to be made in one cycle, plus some reserve for hot water tapping, is arranged directly above the spray head and a filter holder and comprises means for the batchwise heating of an amount of water in the reservoir sufficient for brewing a given amount of coffee.

I claim:

1. A coffee making apparatus in which in a housing (1) above a coffee tank (7) a filter holder (6) is arranged an directly above the filter holder (6) a spray head (5) is arranged, whilst a water reservoir (3) comprising built-in heating means, level control means (15) and a control panel (20) is constructed as a detachable unit and is arranged directly above the spray head, an at least one water outlet of the water reservoir terminates directly above the spray head thereby defining an effective volume of the water reservoir, characterized in that the water outlet is connected to the water reservoir via an outlet valve, the effective volume of the water reservoir (3) located above the outlet valve substantially corresponds to the amount of water necessary for making the relevant amount of coffee to be made in one cycle, and the level control means (15) are adapted for directly admitting water via a connection (24) under the heating means (22, 22a) near the bottom of the reservoir.

2. A coffee making apparatus according to claim 1, characterized in that the water reservoir (3) is constructed in the form of a horizontal U, with a chamber (14) being present between the legs of the U, said chamber comprising the level control means (15) and the outlet valve.

3. A coffee making apparatus according to claim 2, characterized in that the heating means comprise heating elements (22, 22a) having a low-power and a high-power mode, the apparatus further comprises a time switch capable of opening each of the outlet valves (A, B, C) for a desired time, a temperature sensor (23) in the lower part of the reservoir (3) under the (lowermost) outlet valve (C), which sensor is capable of activating the highpower mode (22+22a) of the heater when the temperature in the lower part of the reservoir falls below a set temperature limit, whilst the level control means (15) are adapted for admitting (mains) water via the connection (24) during the brewing cycle.

4. A coffee making apparatus according to claim 2, in which the coffee making apparatus can be set for different amounts of brewed coffee, for instance 1 gallon, 1.5 gallons and 2 gallons (3.6, 5.2 and 7.2 liters), characterized in that three outlet valves (A, B, C) have been provided at such levels that upon drainage of hot water via the outlet valve (A, B, C), the amount of hot water than can drain via the outlet valves (A, B, C) corresponds with the desired amount of coffee.

5. A coffee making apparatus according to claim 4, characterized in that drain outlets (16, 17, 18) are operatively connected to respective outlet valves (A, B, C), an the drain outlets have a diameter selected in accordance with the desired water/coffee contact time.

6. A coffee making apparatus according to claim 2, characterized in that the heating means comprise heating elements (22, 22a) having a low-power and a high-power mode, the apparatus further comprises a time switch capable of opening each of the outlet valves (A, B, C) for a desired time, a temperature sensor (23) in the lower part of the reservoir (3) under the (lowermost) outlet valve (C), which sensor is capable of activating the high-power mode (22+22a) of the heater when the temperature in the lower part of the reservoir falls below a set temperature limit, whilst the level control means (15) are adapted for admitting (mains) water via the connection (24) during the brewing cycle.

7. A coffee making apparatus according to claim 2, in which the coffee making apparatus can be set for different amounts of brewed coffee, for instance 1 gallon, 1.5 gallons and 2 gallons (3.6, 5.2 and 7.2 liters), characterized in that three outlet valves (A, B, C) have been provided at such levels that upon drainage of hot water via the outlet valve (A, B, C), the amount of hot water that can drain via the outlet valve (A, B, C) corresponds with the desired amount of coffee.

8. A coffee making apparatus according to claim 7, characterized in that the respective drain outlets (16, 17, 18) have a diameter selected in accordance with the desired water/coffee contact time.

9. A coffee making apparatus according to claim 7, characterized in that the coffee tank (7) is slidably mounted in the housing (1) of the apparatus.

10. A coffee making apparatus according to claim 7, characterized in that the coffee tank (7) is constructed as a rectangular box which is supported by a carrier having upright edges (9), mounted on a part of a sliding guide (8) whose other part is mounted on the housing (1) of the coffee making apparatus.

11. A coffee making apparatus according to claim 7, characterized in that the tank (7) comprises built-in warming means and the tank (7) and the housing (1) comprise cooperating electrical connecting elements which mutually engage and disengage automatically upon, respectively, retraction and extension of the tank (7).

12. A coffee making apparatus according to claim 7, characterized in that the water reservoir (3) is connected to a drain pipe for the periodical refreshment of the water present in the reservoir (3).

13. A coffee making apparatus according to claim 7, characterized in that a provision has been made at the heating means for compensating air pressure differences.

14. A coffee making apparatus according to claim 1, characterized in that the coffee tank (7) is slidably mounted in the housing (1) of the apparatus.

15. A coffee making apparatus according to claim 1, characterized in that the coffee tank (7) is constructed as a rectangular box which is supported by a carrier having upright edges (9), mounted on a part of a sliding guide (8) whose other part is mounted on the housing (1) of the coffee making apparatus.

16. A coffee making apparatus according to claim 1, characterized in that the tank (7) comprises built-in warming means and the tank (7) and the housing (1) comprise cooperating electrical connecting elements which mutually engage and disengage automatically upon, respectively, retraction and extension of the tank (7).

17. A coffee making apparatus according to claim 1, characterized in that the water reservoir (3) is connected to a drain pipe for the periodical refreshment of the water present in the reservoir (3).

18. A coffee making apparatus according to claim 1, characterized in that a provision has been made at the heating means for compensating air pressure differences.

19. A coffee making apparatus according to claim 1, further comprising a heating element (22, 22a) having a low-power and a high-power mod and a temperature sensor (23), at least one, and preferably there, outlet valves (A, B, C), level control means (15), a timing circuit, a (mains) water inlet (24) and a control device comprising a selector switch, the control device being adapted, on the one hand, for the entire contents of a reservoir (3) to be maintained t a constant temperature of about 95° C. by the heater in the low-power mode, and, on the other, for the timing circuit and one of the outlet valves to be activated by operating the selector switch, such that the desired amount of water flows into the filter holder via the relevant outlet valve and the outlet (16, 17, 18) connected thereto, whilst the level control (15) is adapted for activating the (mains) water inlet, such that the water level in the reservoir remains substantially constant, and the heating device is adapted for measuring, by means of the temperature sensor, the temperature int eh lower part of the reservoir, switching the hating element (22, 22a) to the high-power mode when the measured temperature is lower than a set minimum value, and switching the hating element (22, 22a) back to the low-power mode when the measured temperature exceeds a set maximum value.

* * * * *